United States Patent [19]

Metzemacher et al.

[11] Patent Number: 5,139,875
[45] Date of Patent: Aug. 18, 1992

[54] SURFACES MODIFIED FILLERS

[75] Inventors: Hans-Dieter Metzemacher, Cologne; Rainer Seeling, Bergheim, both of Fed. Rep. of Germany

[73] Assignee: Lonza Ltd., Gampel/Valais, Switzerland

[21] Appl. No.: 607,686

[22] Filed: Nov. 1, 1990

[30] Foreign Application Priority Data

Nov. 1, 1989 [CH] Switzerland ................. 3951/89

[51] Int. Cl.⁵ .............................................. B32B 5/16
[52] U.S. Cl. ................................... 428/403; 428/297; 428/329; 428/330; 428/372; 428/407; 428/447; 428/920; 106/18.11:18.26; 106/287.17; 524/430; 525/911
[58] Field of Search ............... 428/403, 407, 447, 297, 428/329, 330, 372, 920; 524/430; 525/911; 106/18.11, 18.26, 287.17

[56] References Cited

U.S. PATENT DOCUMENTS

| | | | |
|---|---|---|---|
| 3,067,053 | 12/1962 | Tarantino | 106/308 |
| 3,304,197 | 2/1967 | Pundsack et al. | 117/126 |
| 3,816,358 | 6/1974 | Nordsiek et al. | 525/349 |
| 3,816,367 | 6/1974 | Larkin et al. | 260/29.6 R |
| 3,832,326 | 8/1974 | North et al. | 260/42.29 |
| 3,941,610 | 3/1976 | Maskal et al. | 106/308 M |
| 4,098,762 | 7/1978 | Miyata et al. | 260/45.7 R |
| 4,145,404 | 3/1979 | Miyata et al. | 423/635 |
| 4,265,801 | 5/1981 | Moody et al. | 524/430 |
| 4,373,048 | 2/1983 | Schubert et al. | 524/371 |
| 4,551,392 | 11/1985 | Draexler | 428/495 |
| 4,732,939 | 3/1988 | Hoshi et al. | 524/437 |
| 5,017,637 | 5/1991 | Smith et al. | 524/354 |
| 5,025,058 | 6/1991 | Senoo | 524/436 |

FOREIGN PATENT DOCUMENTS 0292233 11/1988 European Pat. Off.
2659933 12/1976 Fed. Rep. of Germany.
50-75230 6/1975 Japan.

OTHER PUBLICATIONS

Chemical Abstracts, (1976), 84:45267t.
Chemical Abstracts, (1972), 76, 114781e.
Chemical Abstracts, (1974), 80, 74131s.

Primary Examiner—Paul J. Thibodeau
Assistant Examiner—Hoa T. Le
Attorney, Agent, or Firm—Fisher, Christen & Sabol

[57] ABSTRACT

Surface-modified magnesium hydroxides and aluminum hydroxides, which are employed as flame-inhibiting fillers in thermoplastic polyolefins.

22 Claims, No Drawings

SURFACES MODIFIED FILLERS

BACKGROUND OF THE INVENTION

1. Field Of The Invention

The invention relates to surface-modified magnesium hydroxide or aluminum hydroxide particles, to the use thereof in thermoplastic polyolefins, and to flame-retardant thermoplastic polyolefins containing the magnesium hydroxide or aluminum hydroxide which has been surface-modified according to the invention.

2. Background Art

On incorporation of magnesium hydroxide or aluminum hydroxide into plastics, problems occur on the one hand with the incorporation of the magnesium hydroxide or aluminum hydroxide into the plastic and compatibility thereof with the plastic, and on the other hand the plastic treated with magnesium hydroxide or aluminum hydroxide must satisfy the required properties, in particular with respect to fire behavior. There has, therefore, been no lack of effort to modify flame-inhibiting fillers in such a manner that they can be incorporated without difficulties into the plastics without adversely affecting the property profile of the plastic, particularly with respect to the fire behavior.

Thus, for example, German Patent No. 2,659,933 discloses coating magnesium hydroxide with anionic, surface-active substances, such as, with alkali metal salts of higher fatty acids. As made clear by our comparative experiments below, magnesium hydroxides modified in this way cannot meet the demands placed on them.

European Published Application No. 292,233 furthermore discloses coating fillers, such as, magnesium hydroxide or aluminum hydroxide, with a polymer containing unsaturated acid groups and incorporating the product into an olefin/acrylate polymer. For example, magnesium hydroxide or aluminum hydroxide is coated in a matrix polymer with a maleinate polybutadiene. However, the polybutadiene coatings, also known as liquid-elastomeric coatings, have the great disadvantage, due to the numerous double bonds, of being very susceptible to the effects of UV and ozone, i.e., the property profile of the correspondingly treated filler or of the filler-containing compound worsens under such effects. In addition, the choice of compounding unit when compounding a filler modified in this way into a plastic is limited by the low temperature tolerance of the coating.

BROAD DESCRIPTION OF THE INVENTION

The object of the invention is to modify magnesium hydroxide or aluminum hydroxide particles in such a way that they do not have the prior art disadvantages noted above. Other objects and advantages of the invention are set out herein or are obvious herefrom to one skilled in the art.

The objects and advantages of the invention are achieved by the compositions and processes of the invention. The main object of the invention is achieved by means of magnesium hydroxide or aluminum hydroxide particles which have been surface-modified according to the invention.

The invention involves surface-modified magnesium hydroxide or aluminum hydroxide particles which nave been treated, for the purposes of surface treatment, with a liquid ethylene-propylene copolymer (EPM) and/or a liquid ethylene-propylene diene terpolymer (EPDM) and additionally with a trans-polyoctenamer (TOR) and/or a thermoplastic elastomer and/or a coupling agent and/or a crosslinking agent.

Magnesium hydroxide is taken to mean magnesium hydroxides of natural or synthetic origin. Natural magnesium hydroxides can be those obtained from seawater or from $Mg(OH)_2$-containing minerals, such as, brucite. Synthetic magnesium hydroxides can be those marketed, for example, by Martinswerk GmbH in Bergheim under the tradename Magnifin ®. The term magnesium hydroxide also covers magnesium hydroxycarbonates, for example, marketed by Microfine Minerals under the tradename Ultracarb ®.

It is expedient to employ magnesium hydroxide particles which have a BET specific surface area of less than 20 $m^2/g$ and a mean particle size $d_{50}$ of less than 2 $\mu m$.

Aluminum hydroxide is taken to mean aluminum hydroxides of natural or synthetic origin. Natural aluminum hydroxides can be those obtained from Al-$(OH)_3$-containing minerals, such as, hydrargillite or gibbsite. Synthetic aluminum hydroxides can be those marketed, for example, by Martinswerk GmbH in Bergheim under the tradename Martifin ® or Martinal ®.

The magnesium hydroxide or aluminum hydroxide particles are surface-treated according to the invention with a liquid ethylene-propylene copolymer (EPM) or a liquid ethylenepropylene diene terpolymer (EPDM). These polymers are also known under the term "liquid elastomers". Expedient termonomers in EPDM are dienes, such as, dicyclopentadiene or norbornadiene. These EPM or EPDM polymers expediently have an ethylene:propylene ratio of from 40:60 to 60:40, and expediently have a mean molecular weight of less than 20,000, preferably from 1,000 to 15,000. The iodine number, as a measure of the number of double bonds, is expediently from 1 to 25 in the EPM or EPDM polymers used. The liquid EPM or EPDM polymers are expediently used in an amount of from 0.1 to 20 parts, preferably from 1 to 5 parts, per 100 parts of magnesium hydroxide or aluminum hydroxide.

The magnesium hydroxide or aluminum hydroxide particles may also be surface-treated with a transpolyoctenamer (TOR). It is expedient to use TOR polymers whose trans content ranges from 40 to 90 percent, preferably from 60 to 80 percent, and whose melting or softening point is expediently from 45° to 90° C. Such trans-polyoctenamer is expediently employed in an amount of from 0.1 to 50 parts, preferably from 0.5 to 5 parts, per 100 parts of magnesium hydroxide or aluminum hydroxide.

The magnesium hydroxide or aluminum hydroxide can, in addition, be surface-treated with a thermoplastic elastomer (TPE), as described, for example, in "Thermoplastische Elastomere im Aufwartstrend"[Thermoplastic Elastomers on the Increase], 2nd Specialist Congress, 10-11.10.1989, Wurzburg, Prof. Dr. Muller, South Germany Plastics Center. The following polymers can be employed, expediently in amounts of from 0.1 to 50 parts, preferably from 0.2 to 30 parts, per 100 parts of magnesium hydroxide or aluminum hydroxide:

EVA and copolymers thereof

Block copolymers comprising hard and soft segments, such as styrene elastomers, such as, for example, SBS, SIS and SEBS thermoplastic PUR elastomers (TPU)

ether-ester block copolymers (EEBC)

polyether-polyamide block copolymers (PEBA), and thermoplastic silicone rubbers (TPQ), or alloys (polymer blends), such as thermoplastic polyolefins, usually with polypropylene (PP) as the polyolefin and an ethylene-propylene copolymer (EPM) or terpolymer (EPDM) as the "soft" segment.

As an alternative to polypropylene as the "hard" segment, one can use amorphous to partially crystalline thermoplastics, such as:
polyamide (PA)
polystyrene (PS) or
styrene-acrylonitrile copolymers (SAN).

The "soft" phase is ethylene-vinyl acetate (EVA) and copolymers thereof, inter alia.

Preferred thermoplastic polymers are silicone rubbers, in particular those described, for example, in German Offenlegungsschrift 2,748,924, or EVA polymers containing from 15 to 70 percent of VA.

In a preferred embodiment, coupling agents can also be employed. This class of compound contains functional groups which ensure that the matrix comprising the (base) polymer and the aggregates of the magnesium hydroxide or aluminum hydroxide particles are best in contact with one another at the interface and are bonded to one another, as far as possible, covalently. Suitable compounds for forming bonds to hydroxylic surfaces are organosilanes, organotitanates, organozirco(alumi)nates or organoaluminates. The organosilanes are expediently those described, for example, in German Patent 2,743,682 or mentioned in the Hüls AG, Marl, brochure "Anwendung von organofunktionellen Silanen, Dynasilan ®" [Use of Organofunctional Silanes, Dynasilan ®], October 1989. Preference is given to vinylsilanes, such as, vinyltriethoxysilane or vinyltrimethoxysilane, amiinosilanes, such as, aminopropyltriethoxysilane, or methacrylylsilanes, such as, (methacryloyloxypropyl)-trimethoxysilanes. The organotitanates, organo-zirco(alumi)nates or organoaluminates expediently used are those described in the "Ken-react reference manual", bulletin KR-1084-2, from Kenrich Petrochemicals Inc. Such coupling agents are expediently employed in amounts of from 0.01 to 10 parts, preferably from 0.05 to 5 parts, per 100 parts of magnesium hydroxide or aluminum hydroxide.

In a further preferred embodiment, crosslinking agents ("interpenetrating network" formers, IPN formers) can additionally be added; these effect mutual penetration of two thermodynamically incompatible (immiscible) polymer systems and thus allow specific control of the property profile of the compound containing the magnesium hydroxide or aluminum hydroxide particles. To form the interpenetrating networks, polysiloxane systems or polysiloxane copolymer systems of this type have proved advantageous, in particular these described, for example, in German Offenlegungsschrift 2,748,924. For example, polysiloxane/polystyrene copolymers, polysiloxane/polycarbonate copolymers, polysiloxane/polyester copolymers, polysiloxane/polyamide copolymers, polysiloxane/polyamide imide copolymers, polysiloxane/polyimide copolymers and/or polysiloxane/polysulfone copolymers are used. The polysiloxane component here can contain reactive functional groups, such as, hydroxysilyl, vinyl, allyl, aryl or methacrylyl groups. The system described can additionally contain crosslinking agents of the silane type which contain functional groups which are capable of reacting with the silanol functions of the polysiloxane component. These crosslinking reactions are expediently catalyzed by suitable catalysts, e.g., carboxylates of the elements Sn, Zn, Fe, Ti or Zr, or alternatively by noble-metal catalysts. The IPN formers are expediently employed in amounts of from 0.1 to 20 parts per 100 parts of filler.

If desired, further processing auxiliaries, such as fatty acids and suitable derivatives thereof, or stabilizers can be added.

For the surface modification, the magnesium hydroxide or aluminum hydroxide particles are treated with the coagents mentioned, expediently in a suitable mixer, preferably in a mixer which facilitates high shear forces. The addition can take place in the selected sequence at certain intervals in time at various temperatures and with process parameters matched to the coagents. A premix of the coagents together with the magnesium hydroxide or aluminum hydroxide particles can be fed to the mixer.

An additive concentrate, a so-called master batch, can advantageously also first be prepared by mixing only some of the filler with the particular coagents in accordance with such process in a mixer with high shear forces. This so-called master batch can then be diluted in a simple manner using a technically less complex mixer, for example, at the customer's premises, with the appropriate amount of additional filler and converted into the ready-to-use surface-modified filler.

The magnesium hydroxide or aluminum hydroxide modified in this way can then be incorporated into a compound by customary methods using the desired thermoplastic polyolefin. Suitable compounders for this purpose are commercially available mixers, such as, single- or twin-screw kneaders or Ko-Kneters.

The magnesium hydroxide or aluminum hydroxide particles surface-treated according to the invention are suitable for flameproofing thermoplastic polyolefins, such as, polyethylene and copolymers thereof, polypropylene or alternatively EVA and copolymers thereof. The surface-treated aluminum hydroxide is usually employed in thermoplastic polyolefins which can be processed up to about 180° C. Suitable representatives of such thermoplastic olefins are, for example, EVA and copolymers thereof, or polyethylene and copolymers thereof. In contrast, the surface-treated magnesium hydroxide is generally employed in the high-temperature range, i.e., in thermoplastic polymers which can be processed at from 180° to above 300° C., preferably in polypropylene. If desired, mixtures of surface-treated magnesium hydroxide and surface-treated aluminum hydroxide can be employed for flameproofing thermoplastic polyolefins. Compared with untreated magnesium hydroxide or aluminum hydroxide particles, they have a bulk density which is higher by up to 50 percent. In addition, the treated magnesium hydroxide or aluminum hydroxide particles are free flowing and can thus be readily metered and are dust-free. The content of surface-treated material in the particular polymer matrix generally varies between 50 and 70 percent, but preferably tends toward the lower percentages within such range in order to minimize impairment of the mechanical property profile of the compound.

The magnesium hydroxide or aluminum hydroxide particle-containing compounds can additionally contain fibrous reinforcing materials. Fiber materials include, for example, glass fibers, rock fibers, metal fibers, polycrystalline ceramic fibers, including monocrystals, so-called "whiskers", and all fibers originating from synthetic polymers, such as, aramid, carbon, polyamide, polyacrylate, polyester and polyethylene fibers.

If desired, the compounds can be provided with suitable pigments and/or dyes.

A surprising impact strength at the same time as a balanced property profile of the polymer matrix is achieved by surface-treating the magnesium hydroxide or aluminum hydroxide particles with a liquid EPM or EPDM polymer and additionally with an above-mentioned trans-polyoctenamer (TOR), Very good tensile strength at the same time as a balanced, good property profile of the polymer matrix is achieved if the magnesium hydroxide or aluminum hydroxide particles have been surface-treated with a liquid EPM or EPDM polymer and additionally with a vinylsilane as the coupling agent.

Surprisingly balanced, good property profiles of the polymer matrix are also achieved by the following combination:

magnesium hydroxide or aluminum hydroxide particles/EPM or EPDM polymer/TOR/vinylsilane as the coupling agent, magnesium hydroxide or aluminum hydroxide particles/TOR/IPN former, magnesium hydroxide or aluminum hydroxide particles/TOR/thermoplastic elastomer.

Comparative Example 1

10 kg of magnesium hydroxide Kisuma 5A (from Kyowa Chemical Ind.) which has been surface-treated in accordance with German Patent No. 2,659,933 was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

Comparative Example 2

10 kg of magnesium hydroxide Magnifin H 10 (from Martinswerk GmbH), having a mean particle size of 1 μm and a mean BET specific surface area of 10 m$^2$/g was fluidized at a temperature of 50° C. in an intensive mixer (fluid/cooling mixer combination). 0.1 kg of a liquid ethylene-propylene terpolymer (EPDM) containing dicyclopentadiene as termonomer and having a mean molecular weight of 7,000 (Trilene 65, Uniroyal) was added at a uniform rate over the course of 60 seconds to the agitated filler. After 5 minutes, the final temperature of from 80° to 100° C. was reached, and the modified magnesium hydroxide was discharged into the cooling mixer. The resultant produce was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 1

15 kg of magnesium hydroxide Magnifin H 10 (from Martinswerk GmbH) which had been treated with 0.15 kg of vinylsilane (A 172, Union Carbide) and had a mean particle size of 1 μm and a mean BET specific surface area of 10 m$^2$/g was fluidized in an intensive mixer (fluid/cooling mixer combination) until a temperature of about 50° C. had been reached. A mixture of 0.69 kg of a liquid ethylene-propylene copolymer (EPM) having a mean molecular weight of 7,200 (Trilene CP 80, Uniroyal) and 0.3 kg of a styrene-butadiene elastomer (Kraton G, Shell) as thermoplastic elastomer was added at a uniform rate over the course of 90 seconds to the agitated filler. When the batch temperature had reached 100° C., the mixture was discharged into the cooling mixer. The filler modified in this way was characterized by a 50 percent higher bulk density, freedom from dust and ease of metering. The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 2

15 kg of magnesium hydroxide Magnifin H 10 (from Martinswerk GmbH), having a mean particle size of 1 μm and a mean BET specific surface area of 10 m$^2$/g, was introduced into an intensive mixer (fluid/cooling mixer combination), and 1.4 kg of a surface-treated magnesium hydroxide, prepared as in Comparative Example 2, in the form of a master batch containing 55 percent of Mg(OH)$_2$, was added into the stationary mixer. After the batch had been fluidized for 5 minutes, the mixer temperature was from about 80° to about 100° C. The product was discharged into the cooling mixer, and 0.15 kg of vinyltriethoxysilane as coupling agent was immediately added. During the cooling phase to 35° C., the vinyltriethoxysilane was incorporated homogeneously. The filler modified in this way was distinguished by a 30 percent higher bulk density, high fluidity therefore very easy metering, and freedom from dust. The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 3

10 kg of magnesium hydroxide Magnifin H 10 (from Martinswerk GmbH), having a mean particle size of about 1 μm and a mean BET specific surface area of about 10 m$^2$/g, was mixed with 200 g (2.0 percent by weight) of vinylsilane (A 172, Union Carbide) and 300 g (3.0 percent by weight) of liquid EPDM containing dicyclopentadiene (DCPD) as a termonomer and having a mean molecular weight of 7,000 (Trilene 65, Uniroyal) for a total of 10 minutes at a final temperature of from 50° to 70° C. in an intensive mixer (fluid/cooling mixer combination). The resultant product was compounded with a polypropylene homopolymer having a mean molecular weight of 4.4'10$^5$ (Vestolen PP 8400, Hüls) in a single-screw unit in such a manner that the compound in each case contained 35 percent of polypropylene and 65 percent of modified magnesium hydroxide.

EXAMPLE 4

10 kg of magnesium hydroxide Magnifin H 10 (from Martinswerk GmbH), having a mean particle size of about 1 μm and a mean BET specific surface area of about 10 m$^2$/g, was mixed with 460 g (4.6 percent by weight) of liquid EPDM containing dicyclopentadiene as termonomer and having a mean molecular weight of 7,000 (Trilene 65, Uniroyal) and with 310 g (3.1 percent by weight) of trans-polyoctenamer (TOR) with a trans content of 80 percent (Vestenamer 8012, Hüls) and a softening range between 55° and 70° C. for a total of 10 minutes at a final temperature of 50° to 70° C. in an intensive mixer (fluid/cooling mixer combination). The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 5

10 kg of magnesium hydroxide Magnifin H 10 (from Martinswerk GmbH), having a mean particle size of about 1 μm and a mean BET specific surface area of 10 m²/g, was mixed with 300 g (3.0 percent by weight) of liquid EPDM containing dicyclopentadiene as termonomer and having a mean molecular weight of 7,000 (Trilene 65, Uniroyal) and with 200 g (2.0 percent by weight) of ethylene-vinyl acetate (Escorene Ultra UL 04028), with 100 g (1.0 percent by weight) of zirconium laurate and with 200 g (2.0 percent by weight) of crosslinked polyethylene (Vistaflex, EXXON) as thermoplastic elastomer for 10 minutes at a final temperature of from 50° to 70° C. in an intensive mixer (fluid/cooling mixer combination). The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 6

10 kg of magnesium hydroxide Magnifin H 10 (from Martinswerk GmbH), having a mean particle size of about 1 μm and a mean BET specific surface area of 10 m²/g, was mixed with 300 g (3.0 percent by weight) of liquid EPDM containing dicyclopentadiene as termonomer and having a mean molecular weight of 7,000 (Trilene 65, Uniroyal), with 200 g (2.0 percent by weight) of an ethylene-vinyl acetate (Escorene Ultra UL 04028, EXXON) as thermoplastic elastomer and with 100 g (1.0 percent by weight) of lauric acid for a total of 10 minutes at a final temperature of 50° to 70° C. in an intensive mixer (fluid/cooling mixer combination). The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 7

10 kg of magnesium hydroxide Magnifin H 10 (from Martinswerk GmbH), having a mean particle size of about 1 μm and a mean BET specific surface area of about 10 m²/g, was mixed with 50 g (0.5 percent by weight) of a quaternary zirconate (NZ 38 J. Kenrich) and 300 g (3.0 percent by weight) of liquid EPDM containing dicyclopentadiene (DCPD) as termonomer and having a mean molecular weight of 7,000 (Trilene 65, Uniroyal) and 200 g (2.0 percent by weight) of PEBA (Pebax Atochem) for a total of 10 minutes at a final temperature of from 50° to 70° C. in an intensive mixer (fluid/cooling mixer combination). The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

EXAMPLE 8

10 kg mf magnesium hydroxide Magnifin H 10 (from Martinswerk μmbH), having a mean particle size of about 1 μm and a mean BET specific surface area of about m²/g, was mixed with 100 g (1.0 percent by weight) of an organopolysiloxane (SFR 100, General Electric Silicones) and 300 g (3.0 percent by weight) of liquid EPDM containing dicyclopentadiene (DCPD) as termonomer and having a mean molecular weight of 7,000 (Trilene 65, Uniroyal) and 200 g (2 percent by weight) of aminosilane (A 1100, Union Carbide) for a total of 10 minutes at a final temperature of from 50° to 70° C. in an intensive mixer (fluid/cooling mixer combination). The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide.

TABLE 1

| | Mg(OH)$_2$ untreated | Comparative Examples | | Examples | | | | | | | |
|---|---|---|---|---|---|---|---|---|---|---|---|
| | | 1 | 2 | 1 | 2 | 3 | 4 | 5 | 6 | 7 | 8 |
| Tensile strength in accordance with DIN 53455 (N/mm²) | 22.0 | 16.1 | 21.5 | 29.0 | 26.0 | 27.0 | 20.0 | 19.6 | 18.5 | 20.0 | 26.0 |
| Elongation at break in accordance with DIN 53455 (m/m) | 0.03 | 0.15 | 0.03 | 0.24 | 0.16 | 0.05 | 0.06 | 0.06 | 0.08 | 0.16 | 0.09 |
| Impact strength in accordance with DIN 53455 (kJ/m²) | 7.5 | 55.0 | 6.5 | n.f. | n.f. | 42.0 | n.f. | 52.0 | n.f. | n.f. | n.f. |
| UL 94 (sample thickness 3 mm) | V0 | V2 | V0 | V0 | V0 | V0 | V0 | V0 | V0 | V0 | V0 |

Notes:
n.f. = no fracture
UL = Underwriter Laboratories

EXAMPLE 9

(Ultracarb)

10 kg of magnesium hydroxide carbonate Ultracarb® U5 (from Microfine Minerals), having a means BET specific surface area of about 15 m²/g, was mixed with 200 g (2.0 percent by weight) of vinylsilane (A 172, Union Carbide) and 300 g (3.0 percent by weight) of liquid EPM having a mean molecular weight of 7,200 (Trilene CP 80, Uniroyal) for a total of 10 minutes at a final temperature of from 50° to 70° C. in an intensive mixer (fluid/cooling mixer combination). The resultant product was compounded with a polypropylene homopolymer having a mean molecular weight of $4.4 \times 10^5$ (Vestolen PP 8400, Hüls) in a single-screw unit in such a manner that the compound in each case contained 35 percent of polypropylene and 65 percent of modified magnesium hydroxide carbonate.

TABLE 2

|  | Ultracarb untreated | Example 9 |
| --- | --- | --- |
| Tensile strength in accordance with DIN 53455 (N/mm²) | 22 | 36 |
| Elongation at break in accordance with DIN 53455 (m/m) | 0.03 | 0.1 |
| Impact strength in accordance with DIN 53453 (kJ/m²) | 7.5 | n.f. |
| UL 94 |  |  |
| (sample thickness 3 mm) | V1 | V0 |
| (sample thickness 1.6 mm) | n.m. | V1 |

Notes:
n.m. = not met
n.f. = no fracture

Comparative Example 3

10 kg of aluminum hydroxide Martinal OL 107 (from Martinswerk GmbH), having a mean particle size of from 0.9 to 1.3 μm and a mean BET specific surface area of from 6 to 8 m²/g, was fluidized at a temperature of 50° C. in an intensive mixer (fluid/cooling mixer combination). 0.1 kg of a liquid ethylene-propylene terpolymer (EPDM) containing dicyclopentadiene as termonomer and having a mean molecular weight of 7,000 (Trilene 65, Uniroyal) was added at a uniform rate over the course of 60 seconds to the agitated filler. After 5 minutes, the final temperature of from 80° to 100° C. was reached, and the modified aluminum hydroxide was discharged into the cooling mixer. The resultant product was compounded with an EVA polymer (Escorene Ultra UL 02020, EXXON) in a single-screw unit in such a manner that the compound in each case contained 35 percent polymer and 65 percent of modified aluminum hydroxide.

EXAMPLE 10

15 kg of aluminum hydroxide Martinal OL 107 (from Martinswerk GmbH), which had been treated with 0.15 kg of vinylsilane (A 172, Union Carbide) and had a mean particle size of from 0.9 to 1.3 μm and a mean BET specific surface area of from 6 to 8 m²/g, was fluidized in an intensive mixer (fluid/cooling mixer combination) until a temperature of about 50° C. had been reached. A mixture of 0.69 kg of a liquid ethylene-propylene copolymer (EPM) having a mean molecular weight of 7,200 (Trilene CP 80, Uniroyal) and 0.3 kg of a styrene/butadiene elastomer (Kraton G, Shell) as thermoplastic elastomer was added at a uniform rate over the course of 90 seconds to the agitated filler. When the batch temperature had reached 100° C., the mixture was discharged into the cooling mixer. The filler modified in this way was characterized by a 50 percent higher bulk density, freedom from dust and ease of metering. The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

EXAMPLE 11

15 kg of aluminum hydroxide Martinal OL 107 (from Martinswerk GmbH), having a mean particle size of from 0.9 to 1.3 μm and a mean BET specific surface area of from 6 to 8 m²/g, was introduced into an intensive mixer (fluid/cooling mixer combination), and 1.4 kg of a surface-treated magnesium hydroxide, prepared as in Comparative Example 2, in the form of a master batch containing 55 percent of Al(OH)₃, was introduced into the stationary mixer. When the batch had fluidized for 5 minutes, the mixer temperature was from about 80° to 100° C. The product was discharged into the cooling mixer, and 0.15 kg of vinyltriethoxysilane as coupling agent was added immediately. During the cooling phase to 35° C., the vinyltriethoxysilane was incorporated homogeneously. The filler modified in this way was distinguished by a 30 percent higher bulk density, high fluidity and thus very easy metering, and freedom from dust. The resultant product was compounded with an EVA polymer (Escorene Ultra UL 02020, EXXON) in a single-screw unit in such a manner that the compound in each case contained 35 percent of EVA polymer and 65 percent of modified aluminum hydroxide

EXAMPLE 12

10 kg of aluminum hydroxide Martinal OL 107 (from Martinswerk GmbH), having a mean particle size of from about 0.9 to 1.3 μm and a mean BET specific surface area of from about 6 to 8 m²/g, was mixed with 200 g (2.0 percent by weight) of vinylsilane (A 172, Union Carbide) and 300 g (3.0 percent by weight) of liquid EPDM containing dicyclopentadiene (DCPD) as termonomer and having a mean molecular weight of 7,000 (Trilene 65, Uniroyal) for a total of 10 minutes at a final temperature of from 50° to 70° C. in an intensive mixer (fluid/cooling mixer combination). The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

EXAMPLE 13

10 kg of aluminum hydroxide Martinal OL 107 (from Martinswerk GmbH), having a mean particle size of from about 0.9 to 1.3 μm and a mean BET specific surface area of from about 6 to 8 m²/g, was mixed with 460 g (4.6 percent by weight) of liquid EPDM containing dicyclopentadiene as termonomer and having a mean molecular weight of 7,000 (Trilene 65, Uniroyal) and with 310 g (3.1 percent by weight) of trans-polyoctenamer (TOR) with a trans content of 80 percent (Vestenamer 8012, Hüls) and a softening range of between 55° and 70° C. for a total of 10 minutes at a final temperature of from 50° to 70° C. in an intensive mixer (fluid/cooling mixer combination). The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

EXAMPLE 14

10 kg of aluminum hydroxide Martinal OL 107 (from Martinswerk GmbH), having a mean particle size of from about 0.9 to 1.3 μm and a mean BET specific surface area of from about 6 to 8 $m^2/g$, was mixed with 300 g (3.0 percent by weight) of liquid EPDM containing dicyclopentadiene as termonomer and having a mean molecular weight of 7,000 (Trilene 65, Uniroyal) and with 200 g (2.0 percent by weight) of ethylene-vinyl acetate (Escorene Ultra UL 04028, EXXON), with 100 g (1.0 percent by weight) of zirconium laurate and with 200 g (2.0 percent by weight) of crosslinked polyethylene (Vistaflex, EXXON) as thermoplastic elastomer for 10 minutes at a final temperature of from 50° to 70° C. in an intensive mixer (fluid/cooling mixer combination). The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

EXAMPLE 15

10 kg of aluminum hydroxide Martinal OL 107 (from Martinswerk GmbH), having a mean particle size of from about 0.9 to 1.3 μm and a mean BET specific surface area of from about 6 to 8 $m^2/g$, was mixed with 300 g (3.0 percent by weight) of liquid EPDM containing dicyclopentadiene as termonomer and having a mean molecular weight of 7,000 (Trilene 65, Uniroyal) and with 200 g (2.0 percent by weight) of an ethylene/vinyl acetate (Escorene Ultra UL 04028, EXXON) as thermoplastic elastomer and with 100 g (1.0 percent by weight) of lauric acid for a total of 10 minutes at a final temperature of from 50° to 70° C. in an intensive mixer (fluid/cooling mixer combination). The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

EXAMPLE 16

10 kg of aluminum hydroxide Martinal OL 107 (from Martinswerk GmbH), having a mean particle size of from about 0.9 to 1.3 μm and a mean BET specific surface area of from about 6 to 8 $m^2/g$, was mixed with 50 g (0.5 percent by weight) of a quaternary zirconate (NZ 38 J, Kenrich) and 300 g (3.0 percent by weight) of liquid EPDM containing dicyclopentadiene (DCPD) as termonomer and having a mean molecular weight of 7,000 (Trilene 65, Uniroyal) and 200 g (2 percent by weight) of PEBA (Pebax Atochem) for a total of 10 minutes at a final temperature of from 50° to 70° C. in an intensive mixer (fluid/cooling mixer combination). The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

EXAMPLE 17

10 kg of aluminum hydroxide Martinal OL 107 (from Martinswerk GmbH), having a mean particle size of from about 0.9 to 1.3 μm and a mean BET specific surface area of from about 6 to 8 $m^2/g$, was mixed with 100 g (1.0 percent by weight) of an organopolysiloxane (SFR 100, General Electric Silicones) and 300 g (3.0 percent by weight) of liquid EPDM containing dicyclopentadiene (DCPD) as termonomer and having a mean molecular weight of 7,000 (Trilene 65, Uniroyal) and 200 g (2 percent by weight) of aminosilane (A 1100, Union Carbide) for a total of 10 minutes at a final temperature of from 50° to 70° C. in an intensive mixer (fluid/cooling mixer combination). The resultant product was compounded with an EVA polymer (Escorene Ultra UL 02020, EXXON) in a single-screw unit in such a manner that the compound in each case contained 35 percent of EVA polymer and 65 percent of modified aluminum hydroxide.

TABLE 3

|  | OL-107 | Comparative Example 3 | Examples 10 | 11 | 12 | 13 | 14 | 15 | 16 | 17 |
|---|---|---|---|---|---|---|---|---|---|---|
| Tensile strength in accordance with DIN 53455 (N/mm$^2$) | 10.0 | 10.5 | 16.0 | 18.0 | 16.0 | 19.0 | 14.0 | 18.0 | 18.5 | 13.0 |
| Elongation at break in accordance with DIN 53455 (m/m) | 0.50 | 0.36 | 0.15 | 0.26 | 0.10 | 0.13 | 0.45 | 0.15 | 0.25 | 0.50 |
| UL 94 (sample thickness 3 mm) | V-2 | V-0 | V-0 | V-0 | V-0 | V-0 | V-0 | V-0 | V-0 | V-0 |
| (sample thickness 2 mm) | — | V-2 | V-0 | V-1 | V-0 | V-2 | V-0 | V-0 | V-2 | V-2 |
| LOI | 45 | | | | | | | | | |

Notes:
UL = Underwriter Laboratories
EVA Escorene Ultra UL 02020 (Extrusions-Type)

TABLE 4

|  | OL-107 | Comparative Example 3 | Examples 18 | 19 | 20 | 21 | 22 |
| --- | --- | --- | --- | --- | --- | --- | --- |
| Tensile strength in accordance with DIN 53455 (N/mm$^2$) | 12.0 | 3.80 | 16.4 | 15.0 | 12.1 | 10.9 | 12.0 |
| Elongation at break in accordance with DIN 53455 (m/m) | 0.08 | 0.04 | 0.16 | 0.10 | 0.21 | 0.15 | 0.11 |
| UL 94 |  |  |  |  |  |  |  |
| (sample thickness 3 mm) | n.m. | V-1 | V-0 | V-0 | V-0 | V-0 | V-0 |
| (sample thickness 2 mm) | — | n.m. | V-2 | V-0 | V-1 | V-1 | V-0 |
| LOI | 35.7 | 35.9 |  |  |  |  |  |

Notes:
n.m. = not met
UL = Underwriter Laboratories
PE 1800 S (BASF)
Lupolen
Example 18 corresponding to Example 11
Example 19 corresponding to Example 12
Example 20 corresponding to Example 17
Example 21 corresponding to Example 14
Example 22 corresponding to Example 13

What is claimed is:

1. Surface-modified magnesium hydroxide or aluminum hydroxide particles consisting of said particles which have been surface treated with a polymer selected from the group consisting of a liquid ethylene-propylene copolymer (EPM), a liquid ethylene-propylene terpolymer (EPDM) and a mixture thereof, the liquid EPM copolymers having a mean molecular weight of less than 20,000, and the liquid EPDM terpolymer having a mean molecular weight of less than 20,000, the ratio of ethylene to propylene in said ethylene-propylene copolymer and in said ethylene-propylene terpolymer being 40:60 to 60:40, and additionally with an additive selected from the group consisting of a trans-polyoctenamer (TOR), a thermoplastic elastomer, a coupling agent, a crosslinking agent and mixtures thereof, the amount of the trans-polyoctenamer being from 0.1 to 20 parts per 100 parts of said surface-modified magnesium hydroxide or aluminum hydroxide, and the amount of the thermoplastic elastomer being from 0.1 to 20 parts per 100 parts of said surface-modified magnesium hydroxide or aluminum hydroxide.

2. The magnesium hydroxide or aluminum hydroxide particles according to claim 1 wherein the liquid EPM or EPDM polymers are present in an amount of from 0.1 to 20 parts per 100 parts of magnesium hydroxide or aluminum hydroxide.

3. The magnesium hydroxide or aluminum hydroxide particles according to claim 2 wherein the trans-polyoctanemers (TOR) have a trans content of between 40 and 90 percent.

4. The magnesium hydroxide or aluminum hydroxide particles according to claim 3 wherein the thermoplastic elastomer is selected from the group consisting of ethylene-vinyl acetate copolymers, styrene elastomers, thermoplastic polyurethane (PUR) elastomers, ether-ester block copolymers, polyether-polyamide block copolymers, thermoplastic silicone rubbers and thermoplastic polyolefins.

5. The magnesium hydroxide or aluminum hydroxide particles according to claim 4 wherein the coupling agent is selected from the group consisting of a silane, titanate, aluminate, zirconate, zircoaluminate and mixtures thereof.

6. The magnesium hydroxide or aluminum hydroxide particles according to claim 5, wherein the coupling agent is present in an amount of from 0.01 to 10 parts per 100 parts of magnesium hydroxide or aluminum hydroxide.

7. The magnesium hydroxide or aluminum hydroxide particles according to claim 6 wherein the crosslinking agents are organopolysiloxanes or organopolysiloxane copolymer systems.

8. The magnesium hydroxide or aluminum hydroxide particles according to claim 7 wherein the crosslinking agents are present in an amount of from 0.1 to 20 parts per 100 parts of magnesium hydroxide or aluminum hydroxide.

9. The magnesium hydroxide or aluminum hydroxide particles according to claim 1 wherein the trans-polyoctenamers (TOR) have a trans content of between 40 and 90 percent. polyoctenamers (TOR) have a trans content of between 40 and 90 percent.

10. The magnesium hydroxide or aluminum hydroxide particles according to claim 1 wherein the thermoplastic elastomer is selected from the group consisting of ethylene-vinyl acetate copolymers, styrene elastomers, thermoplastic (PUR) and polyurethane (PUR) elastomers, ether-ester block copolymers, polyether-polyamide block copolymers, thermoplastic silicone rubbers and thermoplastic polyolefins.

11. The magnesium hydroxide or aluminum hydroxide particles according to claim 1 wherein the coupling agent is selected from the group consisting of a silane, titanate, aluminate, zirconate, zircoaluminate and mixture thereof.

12. The magnesium hydroxide or aluminum hydroxide particles according to claim 1 wherein the coupling agent is present in an amount of from 0.01 to 10 parts per 100 parts of magnesium hydroxide or aluminum hydroxide.

13. The magnesium hydroxide or aluminum hydroxide particles according to claim 1 wherein the crosslinking agents are organopolysiloxanes or organopolysiloxane copolymer systems.

14. The magnesium hydroxide or aluminum hydroxide particles according to claim 1 wherein the crosslinking agents are present in an amount of from 0.1 to 20 parts per 100 parts of magnesium hydroxide or aluminum hydroxide.

15. Process comprising using the surface-modified magnesium hydroxide and/or aluminum hydroxide according to claim 1 as a flame-inhibiting filler in a thermoplastic polyolefin.

16. Process comprising using the surface-modified magnesium hydroxide and/or aluminum hydroxide according to claim 8 as a flame-inhibiting filler in a thermoplastic polyolefin.

17. Process comprising using the surface-modified magnesium hydroxide and/or aluminum hydroxide according to claim 1 as a flame-inhibiting filler in an amount of from 50 to 70 percent by weight in polypropylene.

18. Process comprising using the surface-modified magnesium hydroxide and/or aluminum hydroxide according to claim 8 as a flame-inhibiting filler in an amount of from 50 to 70 percent by weight in polypropylene.

19. Flame-retardant thermoplastic polyolefin containing a surface-modified magnesium hydroxide and/or aluminum hydroxide according to claim 1.

20. Flame-retardant thermoplastic polyolefin containing a surface-modified magnesium hydroxide and/or aluminum hydroxide according to claim 8.

21. Surface-modified magnesium hydroxide or aluminum hydroxide particles consisting of said particles which have been treated with a polymer selected from the group consisting of a liquid ethylene-propylene copolymer (EPM), a liquid ethylene-propylene (EPDM) and a mixture thereof, said liquid ethylene-propylene copolymer having a mean molecular weight of less than 20,000, said liquid ethylene-propylene terpolymer having a means molecular weight of less than 20,000, the ratio of ethylene to propylene in said ethylene-propylene copolymer and in said ethylene-propylene terpolymer being 40:60 to 60:40, and additionally with an additive selected from the group consisting of a transpolyoctenamer (TOR), a thermoplastic elastomer, a coupling agent, a crosslinking agent and mixtures thereof, said particles containing at least one fibrous reinforcing material, the amount of the transpolyoctenamer being from 0.1 to 20 parts per 100 parts of said surface-modified magnesium hydroxide or aluminum hydroxide, and the amount of the thermoplastic elastomer being from 0.1 to 20 parts per 100 parts of said surface-modified magnesium hydroxide or aluminum hydroxide.

22. The magnesium hydroxide or aluminum hydroxide particles according to claim 21 wherein the at least one fibrous reinforcing material is selected from the group consisting of glass fibers, rock fibers, metal fibers, polycrystalline ceramic fibers, aramid fibers, carbon fibers, polyamide fibers, polyacrylate fibers, polyester fibers and polyethylene fibers.

* * * * *